(12) United States Patent
Boelling et al.

(10) Patent No.: US 9,638,269 B2
(45) Date of Patent: May 2, 2017

(54) STARTER FREEWHEEL AND FREEWHEEL ARRANGEMENT HAVING A STARTER FREEWHEEL OF THIS KIND

(71) Applicant: BorgWarner Inc., Auburn Hills, MI (US)

(72) Inventors: Jochen Boelling, Baden-Baden (DE); Dirk Achim Schmitt, Leimen (DE); Richard Baeumler, Brunnen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/548,418

(22) Filed: Nov. 20, 2014

(65) Prior Publication Data

US 2015/0159707 A1    Jun. 11, 2015

(30) Foreign Application Priority Data

Dec. 5, 2013  (DE) .................. 10 2013 020 327

(51) Int. Cl.

| F16D 41/064 | (2006.01) |
|---|---|
| F16F 15/00 | (2006.01) |
| F02N 15/02 | (2006.01) |
| F16D 41/066 | (2006.01) |
| F16D 41/06 | (2006.01) |

(52) U.S. Cl.
CPC ......... *F16D 41/064* (2013.01); *F02N 15/023* (2013.01); *F16D 41/06* (2013.01); *F16D 41/066* (2013.01); *F16F 15/00* (2013.01); *F16D 2041/0605* (2013.01); *F16D 2041/0665* (2013.01); *F16D 2300/22* (2013.01)

(58) Field of Classification Search
CPC ................ F16D 2041/0665; F16D 2041/0605
See application file for complete search history.

(56) References Cited

U.S. PATENT DOCUMENTS

| 1,337,634 | A | * | 4/1920 | Benson | ................. | F16D 41/064 |
|---|---|---|---|---|---|---|
| | | | | | | 188/82.84 |
| 3,965,754 | A | * | 6/1976 | Bowcott | ............... | F02N 15/023 |
| | | | | | | 192/45.018 |
| 5,370,330 | A | * | 12/1994 | Uehara | .............. | A01K 89/0117 |
| | | | | | | 242/247 |
| 2009/0183594 | A1 | * | 7/2009 | Usami | ................... | F02N 15/023 |
| | | | | | | 74/7 C |
| 2010/0108455 | A1 | * | 5/2010 | Shirataki | ............... | F16D 41/066 |
| | | | | | | 192/45.008 |
| 2014/0216191 | A1 | * | 8/2014 | Marsaudon | ............. | F16H 55/14 |
| | | | | | | 74/434 |

FOREIGN PATENT DOCUMENTS

FR    WO2013034862    *    3/2013

* cited by examiner

*Primary Examiner* — Mark Manley
(74) *Attorney, Agent, or Firm* — Reising Ethington PC

(57) ABSTRACT

A starter freewheel is provided. The starter freewheel has a first race, a second race, a wedging gap formed between the first and second races, at least one wedging element arranged in the wedging gap, and at least one further component. The further component is in rotary drive connection with one of the races. The component is formed by at least two sheet-metal parts connected to one another in sandwich-fashion. A freewheel arrangement having a starter freewheel of this kind is also provided.

21 Claims, 4 Drawing Sheets

STARTER FREEWHEEL AND FREEWHEEL ARRANGEMENT HAVING A STARTER FREEWHEEL OF THIS KIND

CROSS-REFERENCE TO RELATED APPLICATIONS

This application claims the benefit of German Patent Application No. 102013020327.9 filed Dec. 5, 2013, the disclosure of which is herein incorporated by reference in its entirety.

FIELD OF THE INVENTION

The present invention relates to a starter freewheel having a first race, a second race, a wedging gap formed between the first and second races, at least one wedging element arranged in the wedging gap, and at least one further component, which is in rotary drive connection with one of the races. The present invention furthermore relates to a freewheel arrangement for a drive train having a starter freewheel of this kind.

BACKGROUND OF THE INVENTION

Starter freewheels which have a first race, a second race, a wedging gap formed between the first and second races, at least one wedging element arranged in the wedging gap, and at least one further component are known in practice. The further components include a torque transmission element, which is used to transmit a torque to and/or from one of the races, for example. In addition, there are known further components in the form of side walls which delimit the abovementioned wedging gap in the axial direction of the starter freewheel. For the purpose of optimizing the installation space in the axial direction, the components mentioned are often designed as sheet-metal parts or as formed sheet-metal parts in order to achieve a particularly light-weight starter freewheel in addition.

The known starter freewheels have proven their worth but they are disadvantageous to the extent that they tend to vibrate, the vibration being due to the wedging elements or the spring elements of the wedging elements or coming from outside, being introduced into the starter freewheel by the starter or the output side of the driving unit, for example. Thus, starting systems of this kind have a greater tendency toward self-oscillations owing, for example, to the excitation due to any gearing that may be present between torque transmission elements. Such oscillations may not only affect the operation of the starter freewheel but also, over and above this, sometimes lead to severe noise generation.

SUMMARY OF THE INVENTION

It is therefore an object of the present invention to provide a starter freewheel which, on the one hand, ensures reliable and continuous operation and, on the other hand, leads to low noise generation. An aspect of the present invention is furthermore based on an object of providing a freewheel arrangement for a drive train of a motor vehicle which has a starter freewheel with the above advantages.

This object is achieved by the features indicated in patent claims 1 and 11, respectively. Advantageous embodiments of the invention form the subject matter of the dependent claims.

The starter freewheel according to an embodiment has a first race, a second race, a wedging gap formed between the first and second races and at least one wedging element within the wedging gap. The two races can be arranged in a radially nested manner, for example, and therefore it is also possible to refer to an outer ring and an inner ring. The first and/or second race is/are preferably designed as a sheet-metal part in the form of an annular disk in order to ensure that the starter freewheel has a small requirement for axial installation space. In principle, the wedging element can have any desired outer contour, although it is preferred if the wedging element has a circular outer contour and is therefore designed as a wedging roller. Moreover, the starter freewheel has at least one further component, which is in rotary driving connection with one of the races, preferably being connected for conjoint rotation. The further component can be a torque transmission element for example, e.g. a starter wheel or a driving wheel, but it is likewise possible for the at least one further component to be formed by a side wall which serves to delimit the wedging gap and, if appropriate, to support the wedging element. The further component is formed by at least two sheet-metal parts connected to one another sandwich-fashion. Since the at least one further component is formed by at least two sheet-metal parts connected to one another sandwich-fashion instead of just one sheet-metal part, both vibrations stemming from the freewheel itself, that is to say, for example, from the moving wedging element or from any spring elements present for preloading the wedging element, or those introduced into the starter freewheel from outside, that is to say, for example, by a starter or an output side of a driving unit, can be damped in an effective manner, thus, on the one hand, ensuring reliable and continuous operation of the starter freewheel and, on the other hand, reducing noise generation in the region of the starter freewheel.

In an embodiment of the starter freewheel, the two sheet-metal parts which form the further component are connected to one another nonpositively. Any nonpositive connection is possible here, although it is preferred if the nonpositive connection between the two sheet-metal parts is accomplished by screwing or riveting.

In another embodiment of the starter freewheel, the two sheet-metal parts forming the component are connected to one another positively.

In another embodiment of the starter freewheel, the two sheet-metal parts which form the abovementioned component are connected to one another materially. It is preferred here if the two sheet-metal parts are connected to one another by adhesive bonding or welding, although adhesive bonding is particularly preferred, especially since a large-area connection between the two sheet-metal parts can thereby be achieved.

In another embodiment of the starter freewheel, the two sheet-metal parts which form the abovementioned component are connected to one another nonpositively, positively and/or materially, and it is therefore also possible to speak of a combination of the various types of connection.

Although a significant reduction in vibrations and thus in noise generation can already be achieved through the sandwich-type connection of the two sheet-metal parts without a layer in between, in an embodiment of the starter freewheel, the two sheet-metal parts are connected to one another with a damping layer placed in between. It has been found that a further reduction in vibration and thus greater noise reduction is thereby possible. Thus, in the case of sheet-metal parts which are adhesively bonded to one another, the damping layer could be formed exclusively by the adhesive or an adhesive layer itself, but it is also advantageous if the damping layer is not formed by an adhesive and, at most, is connected to the respective sheet-metal part by means of an adhesive or in some other way, if appropriate materially, positively and/or nonpositively. In principle, it would also be possible for the damping layer to be formed by another sheet-metal part.

In another embodiment of the starter freewheel, the damping layer is softer and/or more flexible than the two sheet-metal parts in order to achieve improved damping and therefore a lower tendency to vibration and less noise generation. It is furthermore preferred here if the damping layer is formed from a viscoelastic and/or nonmetallic material.

In another embodiment of the starter freewheel, the damping layer is adhesively bonded to at least one of the sheet-metal parts in order to simplify manufacture and to achieve large-area connection between the sheet-metal part or sheet-metal parts, on the one hand, and the damping layer, on the other. It has proven advantageous here if the damping layer is adhesively bonded to both sheet-metal parts which form the abovementioned component.

In another embodiment of the starter freewheel, the damping layer is vulcanized to at least one of the sheet-metal parts, preferably to both sheet-metal parts. In other words, the damping layer was vulcanized to one or both sheet-metal parts, with said layer being bonded on.

In another embodiment of the starter freewheel, the damping layer is designed as a damping layer separate from the sheet-metal parts, wherein the damping layer is clamped between the sheet-metal parts, which can be connected to one another by screwing or riveting, for example, but alternatively also by welding.

In another embodiment of the starter freewheel, the at least one component, which is formed by at least two sheet-metal parts connected to one another sandwich-fashion, is a torque transmission element for transmitting a torque to and/or from the race with which the component is in rotary drive connection. Those vibrations, in particular, which are introduced into the starter freewheel from the outside, e.g. from the output side of a starter or the output side of a driving unit, are thereby damped in an effective manner. Thus, it is ensured in this embodiment that the vibrations introduced into the freewheel from the outside do not have a disadvantageous effect on the operation of the starter freewheel and/or lead to noise generation in the region of the starter freewheel.

In another embodiment of the starter freewheel, the two sheet-metal parts which form the component in the form of a torque transmission element are connected to one another in such a way that the torque can be transmitted via just one of the two sheet-metal parts. By virtue of this functional separation, tailored design of the two sheet-metal parts is possible. Thus, for example, a weight saving can be achieved since one sheet-metal part is made thinner than the other, torque-transmitting sheet-metal part of the torque transmission element.

In another embodiment of the starter freewheel, the torque transmission element is designed as a starter wheel for torque transmission between the output side of a starter and one of the two races. In this case, the starter wheel can furthermore have a starter ring which is connected for conjoint rotation to at least one of the two sheet-metal parts, preferably to the sheet-metal part transmitting the torque. As an alternative, however, it is also possible for the starter ring to be formed integrally with at least one of the two sheet-metal parts, preferably with the sheet-metal part transmitting the torque.

In another embodiment of the starter freewheel, the torque transmission element is designed as a driving wheel which serves to transmit torque between the output side of a driving unit, that is to say, for example, the output shaft of an internal combustion engine, and one of the races.

In another embodiment of the starter freewheel, the at least one component formed by the at least two sheet-metal parts connected to one another sandwich-fashion is a side wall for delimiting the wedging gap between the races. This embodiment is suitable particularly for effectively damping the vibrations stemming from the starter freewheel itself, that is to say, for example, the vibrations caused by the wedging elements or the spring elements associated with the wedging elements, and thus for ensuring reliable operation of the starter freewheel and low noise generation in the region of the starter freewheel. Here, the at least one side wall is preferably arranged in such a way that the wedging element, a wedging element cage and/or a spring element for preloading the wedging element can be supported or is/are supported on the side wall.

In another embodiment of the starter freewheel, the sheet-metal part of the side wall which is adjacent to the wedging gap or at least the side of said sheet-metal part which faces the wedging gap is more wear resistant and/or more corrosion resistant and/or less subject to friction than the sheet-metal part of the side wall which is remote from the wedging gap or at least the surface of the sheet-metal part of the side wall which is remote from the wedging gap. It is thereby possible to increase the life of the starter freewheel, while the hysteresis behavior of the starter freewheel is also improved, this being the case particularly if the wedging element, a wedging element cage for the wedging element and/or a spring element for preloading the wedging element can be supported or is/are supported on the side wall, more precisely on the sheet-metal part of the side wall which is adjacent to the wedging gap.

In principle, the side wall for delimiting the wedging gap does not have to transmit any torque. Nevertheless, in another embodiment of the starter freewheel, the side wall is likewise designed as a torque transmission element. This can be accomplished, for example, by securing a torque transmission element on one of the two races with the side wall placed in between, or by making the torque transmission element of integral design with the side wall, although the first-mentioned variant embodiment is preferred so as to achieve an advantageous functional separation here.

In another embodiment of the starter freewheel, the respective component formed from the at least two sheet-metal parts connected to one another sandwich-fashion is designed in such a way that the side face, facing the one sheet-metal part, of the other sheet-metal part rests or is supported by at least 50%, preferably by at least 90%, particularly preferably fully, on the one sheet-metal part, and, if appropriate, this can be accomplished with the abovementioned damping layer placed in between. In other words, the two sheet-metal parts forming the component do not necessarily have to be connected to one another completely sandwich-fashion, even though the greater the vibration or noise reduction is, the greater is the percentage mentioned.

In another embodiment of the starter freewheel, a spring element for preloading the wedging element into a predetermined position is provided—as already indicated above. Thus, the wedging element can be preloaded by means of the spring element into a wedging position, in which the wedging element prevents a rotation of the first race relative to the second race in a first circumferential direction, for example, wherein the wedging element can be moved counter to the restoring force of the spring element into a release position, in which the first race can be rotated relative to the second race in an opposite, second circumferential direction.

In another embodiment of the starter freewheel, the spring element has an elongate spring body—similarly to a helical spring. However, the elongate spring body is not wound in a helix; on the contrary, the elongate spring body extends in a radial plane, i.e. in a plane defined by the radial directions of the starter freewheel, wherein the elongate spring body has a corrugated profile in the radial direction. It would also be possible to say that the spring body has a corrugated profile in the direction of the races situated opposite one another or arranged in a radially nested manner. Thus, for example, the elongate spring body can have an undulating or zigzag profile in the radial direction, while the elongate spring body extends in the radial plane. Since the elongate spring body extends in the radial plane, it is particularly suitable for use within a wedging gap which has a particularly small extent or width in relation to the axial direction. Thus, a freewheel with a particularly small axial overall length can be created by virtue of the fact that the elongate spring body of the spring element extends in the radial plane. Moreover, the corrugated profile of the elongate spring body in the radial direction makes it possible for the spring element to have a significantly greater extent in the radial direction than in the axial direction. Consequently, a spring element of this kind is suitable for extending over a large part of the width in the axial direction and substantially over the entire height of the wedging gap in the radial direction and thus for largely filling the wedging gap. This has the advantage that a wedging element designed to correspond to the wedging gap can be supported in a particularly reliable manner on the spring element without the need to take further measures in this regard, as is the case, for example, with a spring element designed as a helical spring which has the same extent in the axial direction and in the radial direction and is consequently not suitable for filling the height of a relatively narrow wedging gap. The attachment, fastening or support of the spring element on the first race, the second race or the side wall is also thereby simplified.

In another embodiment of the starter freewheel, the spring body is formed by a sheet-metal part or wire. The sheet-metal part can be formed, for example, by a sheet-metal strip which has a corrugated profile in the radial direction, wherein the direction of the width of the sheet-metal strip in this case preferably corresponds to the axial direction of the starter freewheel. The wire can have a circular cross section, for example, thus making it possible to have recourse to a standardized or simple wire in the course of manufacturing the spring element, this reducing the outlay on manufacture.

In another embodiment of the starter freewheel, the corrugated profile of the spring body in the radial direction means that said body has radially outer corrugation peaks and radially inner corrugation troughs, between which legs of the spring body can extend. Such legs are preferably of rectilinear design or have a rectilinear profile. In this embodiment, it is preferred if at least two, if appropriate at least three, corrugation peaks and at least two, if appropriate three, corrugation troughs are provided.

In another embodiment of the starter freewheel, the spring body has different widths in the axial direction of the starter freewheel. In this way, a potential contact area between a side wall and the spring element which may be supported on the side wall is reduced, with the result that the friction between the spring element and the side wall is also reduced. The result is that the hysteresis behavior of the starter freewheel is improved. Moreover, unhindered operation of the spring element is ensured by virtue of the reduced friction between the spring element and the side wall.

In another embodiment of the starter freewheel, the spring body is secured on the first race, the second race and/or the side wall. In order to ensure simple assembly and secure retention of the spring body on the first race, the second race and/or the side wall in this case, the spring body is preferably secured with a latching action on the first race, the second race and/or the side wall.

In another embodiment of the starter freewheel, the wedging element is designed as a wedging roller. In this context, a wedging roller refers, in particular, to a wedging element having a circular circumference or a circular outer contour. Here, the ratio of a width to an outside diameter of the wedging roller is preferably less than or equal to 1:2 or 1:3, particularly preferably less than or equal to 1:4, if appropriate less than or equal to 1:5. This has the advantage that it is possible to provide a starter freewheel which has a small axial overall length, especially since the wedging roller dimensioned in this way itself has a relatively small axial extent, thus enabling the wedging gap too to have a correspondingly small extent in the axial direction of the starter freewheel. Moreover, the abovementioned spring element with the elongate spring body which extends in a radial plane and has a corrugated profile in the radial direction unfolds, particularly for support, especially since only an appropriately designed spring body is capable of reliably supporting the wedging element and of being accommodated effectively within the wedging gap dimensioned to correspond to the wedging element.

The freewheel arrangement is designed for a drive train, preferably a drive train within a motor vehicle, and has a starter freewheel of the above-described type according to the invention.

In another embodiment of the freewheel arrangement, the starter freewheel is designed as a dry-running freewheel, and therefore at least the wedging gap is not filled with a coolant and/or lubricant, such as oil or grease. On the contrary, it is preferred here if the starter freewheel is arranged within a dry space or at least sealed off in an appropriate manner. Irrespective of this, however, the starter freewheel can of course also be used in a wet space, and therefore it can in principle also be employed as a wet-running or wet starter freewheel.

In another embodiment of the freewheel arrangement, one of the races of the starter freewheel is in continuous rotary drive connection with the output side of a starter. It is preferred here if the continuous rotary drive connection between the race and the output side of the starter is accomplished via the abovementioned starter wheel.

In another embodiment of the freewheel arrangement, one of the races, preferably the race in continuous rotary drive connection with the output side of the starter, is supported on the output side of a driving unit or on a fixed housing via a radial bearing, wherein the output side of the driving unit can be the output shaft of an internal combustion engine, for example, and the fixed housing can be the housing of the driving unit or of the internal combustion engine, for example. A rolling bearing can be taken into consideration as a radial bearing, for example, and can furthermore be sealed off. However, it has proven advantageous if the radial bearing is designed as a sliding bearing, wherein the sliding bearing should preferably be designed as a dry sliding bearing or dry-running sliding bearing.

In another embodiment of the freewheel arrangement, the radial bearing is arranged between the race, on the one hand, and a supporting part, which is secured on the fixed housing and, if appropriate, is detachable and/or annular.

In another embodiment of the freewheel arrangement, a torque transmission element is provided for transmitting a torque between an output side of a driving unit and one of the races. As already indicated above, the torque transmission element can form that component of the starter freewheel which is formed by at least two sheet-metal parts connected to one another sandwich-fashion. However, it is particularly preferred here if the torque transmission element for transmitting the torque between the output side of the driving unit and one of the races is designed as a flexplate, thus allowing the torque transmission element to compensate both axial displacements of the output side of the driving unit relative to the starter freewheel and also tilting of the output side of the driving unit relative to the axis of rotation of the starter freewheel through appropriate deformation.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
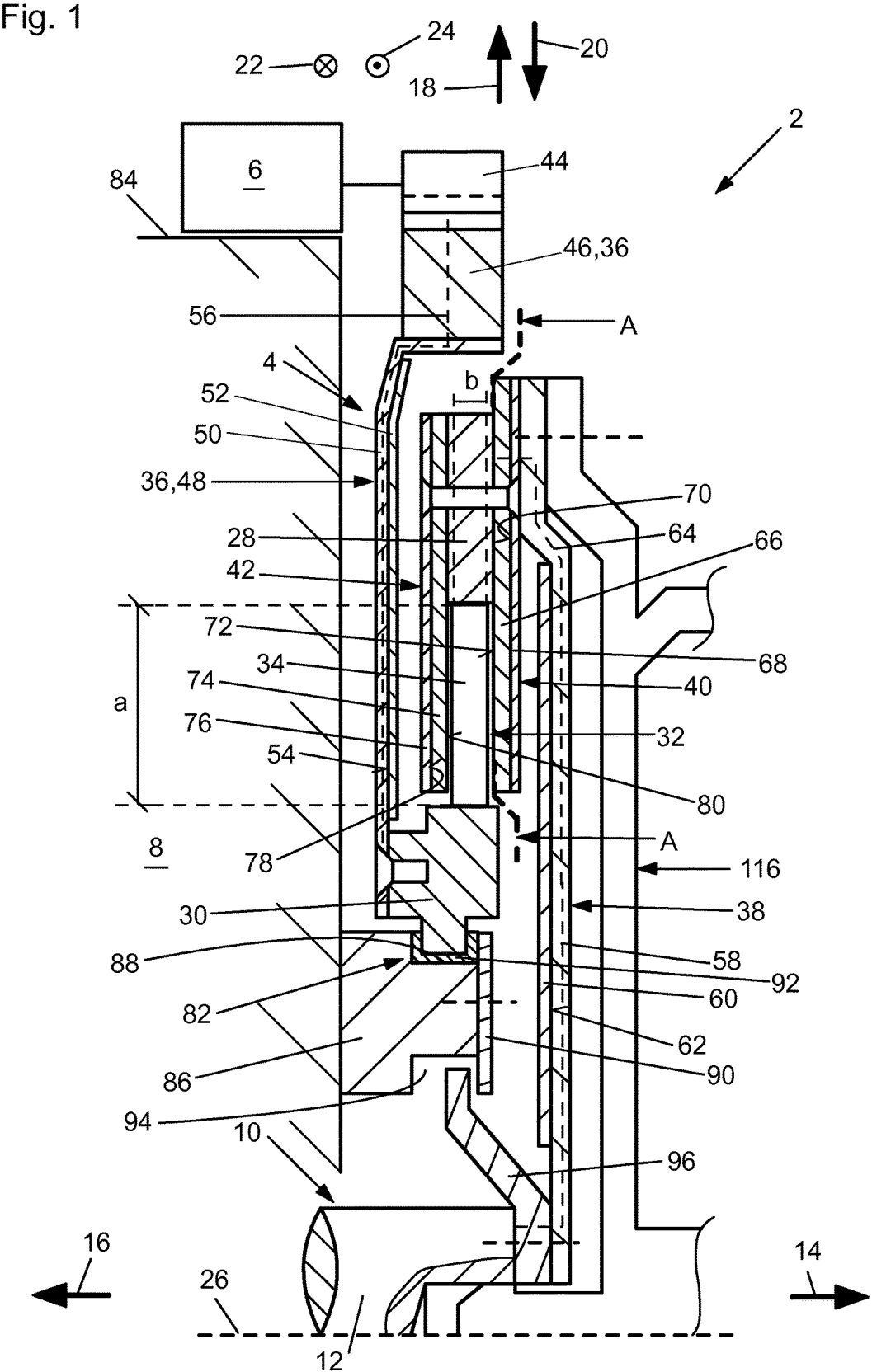
FIG. 1 shows a partial side view of a freewheel arrangement having a first embodiment of the starter freewheel according to the invention in section.

FIG. 1 shows a first embodiment of the freewheel arrangement 2 according to the invention within a drive train of a motor vehicle. The freewheel arrangement 2 essentially has a starter freewheel 4, a starter 6, which is indicated only schematically in FIG. 1, and a driving unit 8, the output side 10 of which is formed by an output shaft 12. The driving unit 8 can be an internal combustion engine for example, and therefore the output shaft 12 could also be referred to as a crankshaft.

In the figures, the mutually opposite axial directions 14, 16, the mutually opposite radial directions 18, 20 and the mutually opposite circumferential directions 22, 24 of the freewheel arrangement 2 and of the starter freewheel 4 are indicated by corresponding arrows, wherein circumferential direction 22 is also referred to below as the first circumferential direction 22 and circumferential direction 24 is also referred to below as the second circumferential direction 24. The axis of rotation 26 of the output side 10 of the driving unit 8 and of the starter freewheel 4 extends in the axial directions 14, 16. The first and second circumferential directions 22, 24 can also be referred to as the first and second directions of rotation.

The starter freewheel 4 has a first race 28 and a second race 30. In the embodiment illustrated, the first race 28 is designed as an outer ring, which is arranged to the outside of the second race 30 in radial direction 18, and therefore it is also possible to refer in the case of the second race 30 to an inner ring. The two races 28, 30 are arranged in a nested manner in the radial direction 18, 20, with the result that a wedging gap 32 running around in the circumferential direction 22, 24 is formed between the first and second races 28, 30. At least one wedging element 34 of the starter freewheel 4 is arranged within the wedging gap 32. The starter freewheel 4 furthermore has further components, which are in rotary driving connection, in this case connected for conjoint rotation, with one of the races 28, 30. These further components are a starter wheel 36, a driving wheel 38, a first side wall 40 and a second side wall 42, wherein said components will be described in greater detail below.

The starter wheel 36 is designed as a torque transmission element and is used to transmit torque between an output side 44 of the starter 6, which here is designed as a pinion that can be driven by the starter 6, and the second race 30. The starter wheel 36 is composed essentially of an outer ring gear 46, the teeth of which are in continuous rotary driving engagement with the teeth of the pinion forming the output side 44 of the starter 6, and of a sheet-metal section 48, which adjoins the ring gear 46 on the inside in radial direction 20 and is connected for conjoint rotation to the second race 30 on the inside in radial direction 20. The sheet-metal section 48 of the starter wheel 36 is formed by two sheet-metal parts connected to one another sandwich-fashion, namely a first sheet-metal part 50 and a second sheet-metal part 52. The side face 54 of the second sheet-metal part 52 which faces the first sheet-metal part 50 and faces substantially in axial direction 16 rests fully on the first sheet-metal part 50 or is fully supported on the first sheet-metal part 50. The sheet thickness of the second sheet-metal part 52 is made less than the sheet thickness of the first sheet-metal part 50. Of course, the sheet-metal parts 50, 52 can also be arranged the opposite way round so that the side face of the second sheet-metal part 52 which faces the first sheet-metal part 50 and faces substantially in axial direction 14 rests on and/or is fully supported on the first sheet-metal part 50.

The second sheet-metal part 52 is connected to the first sheet-metal part 50 in such a way that a torque is transmitted between the output side 44 of the starter 6 and the second race 30 only via one of the two sheet-metal parts 50, 52, namely via the first sheet-metal part 50 but not via the second sheet-metal part 52. In the embodiment illustrated, this is achieved by the fact that, on the one hand, the first sheet-metal part 50 is connected for conjoint rotation to the second race 30, while the second sheet-metal part 52 is connected only indirectly, via the first sheet-metal part 50, to the second race 30 and, on the other hand, the first sheet-metal part 50 is connected for conjoint rotation to the ring gear 46, while the second sheet-metal part 52 is connected only indirectly, via the first sheet-metal part 50, to the ring gear 46. At this point, it should furthermore be mentioned that the ring gear 46 of the starter wheel 36 can also be formed integrally with the first sheet-metal part 50. Consequently, a torque transmission path 56 between the output side 44 of the starter 6 and the second race 30, which is indicated in dashed lines in FIG. 1, passes via the ring gear 46 and the first sheet-metal part 50 but not via the second sheet-metal part 52.

The driving wheel 38 serves to transmit torque between the output side 10 of the driving unit 8 and the first race 28. In this arrangement, the driving wheel 38 is secured for conjoint rotation on the inside in radial direction 20 on the output shaft 12 forming the output side 10 of the driving unit 8, while a section of the driving wheel 38 situated on the outside in radial direction 18 is secured for conjoint rotation on the first race 28, with the first side wall 40 described in greater detail below placed in between. The driving wheel 38 is formed by two sheet-metal parts connected to one another sandwich-fashion, namely a first sheet-metal part 58 and a second sheet-metal part 60. The side face 62 of the second sheet-metal part 60 which faces the first sheet-metal part 58 and faces substantially in axial direction 14, rests fully on the first sheet-metal part 58 or is supported fully on the first sheet-metal part 58.

The two sheet-metal parts 58, 60 are connected to one another in such a way that torque is transmitted between the output side 10 of the driving unit 8 and the first race 28 only via one of the two sheet-metal parts 58, 60, namely the first sheet-metal part 58. In other words, the torque transmission path 64 between the output side 10 of the driving unit 8, on the one hand, and the first race 28, on the other hand, which is indicated in dashed lines in FIG. 1, runs via the first sheet-metal part 58 but not via the second sheet-metal part 60, which is connected only indirectly, via the first sheet-metal part 58, to the output side 10 and the first race 28.

In an alternative variant embodiment, which is likewise indicated in FIG. 1, the torque transmission element for transmitting a torque between the output side 10 of the driving unit 8 and the first race 28 is designed as a "flexplate" which allows displacement of the output side 10 in the axial directions 14, 16 and tilting of the output side 10 relative to the axis of rotation 26 through appropriate deformation of the flexplate without the starter freewheel 4 itself having to perform a corresponding movement. Consequently, reliable and unaffected operation of the starter freewheel 4 is thereby ensured, even if the output side 10 of the driving unit 8 performs said movements.

The first side wall 40 delimits the wedging gap 32 in axial direction 14, wherein the first side wall 40 is connected for conjoint rotation by means of an outer section in radial direction 18 to the side of the first race 28 which faces in axial direction 14. In this case, the first side wall 40 delimits the wedging gap 32 in such a way that at least the wedging element 34, a wedging element cage which may be present and/or a spring element, described in greater detail below, for preloading the wedging element 34 in axial direction 14 can be supported or is/are supported on the first side wall 40. The first side wall 40 is formed by two sheet-metal parts connected to one another sandwich-fashion, namely a first sheet-metal part 66 and a second sheet-metal part 68, wherein the first sheet-metal part 66 faces the wedging gap 32 and the first race 28 in axial direction 16. The side face 70 of the second sheet-metal part 68 which faces the first sheet-metal part 66 and faces substantially in axial direction 16 rests fully on the first sheet-metal part 66 or is supported fully on the first sheet-metal part 66.

The first sheet-metal part 66 or at least the side 72 thereof which faces the wedging gap 32 is more wear resistant and/or corrosion resistant and/or less subject to friction than the second sheet-metal part 68 remote from the wedging gap 32 or at least the surface or side face 70 thereof. This can be achieved, for example, through appropriate selection of the material for the first sheet-metal part 66 and the second sheet-metal part 68, but it is likewise possible to treat the surface of the side 72 of the first sheet-metal part 66 in an appropriate manner or even to provide it with a wear resistant, corrosion resistant and/or low friction coating. As previously in the case of the second sheet-metal parts 52 and 60 of the starter wheel 36 and of the driving wheel 38, respectively, the second sheet-metal part 68 of the first side wall 40 also has a smaller sheet thickness than the first sheet-metal part 66 of the first side wall 40.

As already indicated above, the driving wheel 38 or the flexplate is secured for conjoint rotation on the first race 28, with the first side wall 40 placed in between, with the result that the first side wall 40 is likewise designed as a torque transmission element in the embodiment illustrated, especially since the torque transmission path 64 between the output side 10 of the driving unit 8 and the first race 28 also passes via a section of the first side wall 40. However, this does not necessarily have to be the case. On the contrary, the driving wheel 38 or the flexplate can also be secured on the first race 28 while bypassing the first side wall 40, with the result that the torque transmission path 64 does not pass via the first side wall 40 either, which therefore does not act as a torque transmission element. Moreover, the second sheet-metal part 68 of the first side wall 40 could be secured in such a way on the first sheet-metal part 66 of the first side wall 40 that the torque transmission path 64 passes only via the first sheet-metal part 66 but not via the second sheet-metal part 68 of the first side wall 40. It would also be possible for the two sheet-metal parts 66, 68 to be connected to one another in such a way that the torque transmission path 64 passes only via the second sheet-metal part 68 and not via the first sheet-metal part 66 of the first side wall 40. In the two last-mentioned cases, the respective sheet-metal part 68 or 66 would have to be arranged further inward in radial direction 20 on the other sheet-metal part 66 or 68 in order to position it outside the torque transmission path 64.

The second side wall 42 delimits the wedging gap 32 in axial direction 16, wherein the second side wall 42 is secured for conjoint rotation for this purpose on the side of the first race 28 which faces in axial direction 16 and extends inward in radial direction 20 in order to delimit the wedging gap 32 in the manner stated. In the embodiment illustrated, the second side wall 42 does not form a torque transmission element via which a torque could be transmitted to the first race 28 from another component or to another component from the first race 28. At least the wedging element 34, any wedging element cage that is present and/or a spring element, described in greater detail below, for preloading the wedging element 34 in axial direction 16 can be supported or is/are supported on the second side wall 42. The second side wall 42 is also formed by two sheet-metal parts connected to one another sandwich-fashion, namely a first sheet-metal part 74 and a second sheet-metal part 76, wherein the first sheet-metal part 74 is adjacent to the wedging gap 32 in axial direction 14. The side face 78 of the second sheet-metal part 76 which faces the first sheet-metal part 74 rests fully on the first sheet-metal part 74 or is supported fully on the first sheet-metal part 74.

The first sheet-metal part 74 adjacent to the wedging gap 32 or at least the side 80 thereof which faces the wedging gap 32 is more wear resistant and/or corrosion resistant and/or less subject to friction than the second sheet-metal part 76 remote from the wedging gap 32 or at least the surface or side face 78 thereof, it being possible to achieve this by appropriate selection of materials, surface treatment or coating, for example, as already described with reference to the first side wall 40. In the case of the second side wall 42 too, the second sheet-metal part 76 has a smaller sheet thickness than the first sheet-metal part 74. As already in the case of the first side wall 40, it would also be possible here in principle for both sheet-metal parts 74, 76 of the second side wall 42 to be provided with an appropriate coating but, in the case of the first-mentioned variant, it is possible to dispense with the coating of the second sheet-metal part 76, reducing the outlay on manufacture.

In the above description, it is stated that the side faces 54, 62, 70 and 78 of the second sheet-metal parts 52, 60, 68 and 76 which face the first sheet-metal parts 50, 58, 66 and 74, respectively, each rest or are supported fully on the other sheet-metal part 50, 58, 66 or 74, respectively. As an alternative, however, it may also already be sufficient to achieve the advantages stated at the outset if the side face 54, 62, 70 or 78 of the second sheet-metal part 52, 60, 68 or 76 which faces the first sheet-metal part 50, 58, 66 or 74, respectively, rests or is supported by at least 50%, preferably by at least 90%, on the first sheet-metal part 50, 58, 66 or 74, respectively, although full contact or support is particularly preferred here.

The two sheet-metal parts 50, 52 of the starter wheel 36, the two sheet-metal parts 58, 60 of the driving wheel 38, the two sheet-metal parts 66, 68 of the first side wall 40 and the two sheet-metal parts 74, 76 of the second side wall 42 can be connected to one another nonpositively, positively and/or materially in order to connect said sheet-metal parts to one another for conjoint rotation, said parts being connected to one another sandwich-fashion. In the case of a nonpositive connection, this is preferably brought about by screwing or riveting, although a corresponding illustration of screws or rivets has been omitted in the figures. In the case of a material connection, the sheet-metal parts connected to one another sandwich-fashion are preferably bonded to one another adhesively or welded to one another, adhesive bonding being particularly preferred, especially since it is possible by this means to achieve a particularly large-area connection between the sheet-metal parts connected to one another sandwich-fashion.

In the embodiment illustrated, the sheet-metal parts 50, 52, 58, 60, 66, 68, 74, 76 are substantially in the form of annular disks. However, this does not necessarily have to be the case. Thus, although it is preferred if at least the first sheet-metal parts 50, 58, 66, 74 are substantially in the form of annular disks, it is also possible to dispense with the integral and/or annular-disk-shaped second sheet-metal part 52, 60, 68, 76 in favor of a plurality of second sheet-metal parts in each case, these being spaced apart and connected to the respective first sheet-metal part 50, 58, 66, 74 and, if appropriate, being arranged in series in the circumferential direction 22, 24 on the first sheet-metal part 50, 58, 66, 74.

The second race 30 is supported both in radial direction 18, 20 and in axial direction 14, 16 on a fixed housing 84 by means of a radial bearing 82, which in this case is designed as a dry sliding bearing. Here, the fixed housing 84 is the housing of the driving unit 8. As an alternative, it would also be possible for support to be provided on the output side 10 of the driving unit 8, in the present example therefore on the output shaft 12, by means of the radial bearing 82. In the embodiment illustrated, mounting or support is not provided directly on the fixed housing 84 by means of the radial bearing 82, however; on the contrary, the radial bearing 82 is arranged between the second race 30, on the one hand, and an annular supporting part 86 secured detachably on the fixed housing 84. The supporting part 86 has an outer encircling recess 88, into which the second race 30 can be inserted in axial direction 16 in order to provide support or mounting in radial direction 18, 20 and in axial direction 16. Once the second race 30 has been introduced into the encircling recess 88, an encircling supporting part cover 90 can be secured in such a way on the supporting part 86, if appropriate detachably, that the encircling recess 88 is bounded in axial direction 14 by the supporting part cover 90, thus also providing support or mounting of the second race 30 in axial direction 14 on the supporting part 86 and thus on the fixed housing 84 by means of the supporting part cover 90. This significantly simplifies the assembly of the starter freewheel 4. As indicated in FIG. 1, an antifriction part or antifriction coating 92 can be secured on the second race 30 in order to achieve the sliding bearing arrangement, said part or coating being introduced into the abovementioned encircling recess 88. In a corresponding manner, an antifriction part or antifriction coating can also be provided in the encircling recess 88 itself.

As can furthermore be seen from FIG. 1, the supporting part 86 has not only the encircling recess 88 provided on the outside in radial direction 18 on the supporting part 86 but also an encircling recess 94 on the side facing inward in radial direction 20, said recess 94 being delimited in axial direction 16 by the supporting part 86 and in axial direction 14 by the supporting part cover 90 secured detachably on the supporting part 86. On the output side 10 of the driving unit 8 or the output shaft 12, on the other hand, there is secured a limiting part 96, which is fixed in relation to the axial directions 14, 16 on the output side 10 and extends outward into the encircling recess 94 in radial direction 18. Thus, the limiting part 96 in conjunction with the encircling recess 94 serves to limit the ability of the output side 10 to move in relation to the supporting part 86 and thus in relation to the second race 30 of the starter freewheel 4. Consequently, the supporting part 86 in conjunction with the supporting part cover 90 has a dual function.

In the illustrated embodiment of the freewheel arrangement 2, the starter freewheel 4 is designed as a dry-running freewheel, i.e. no coolant and/or lubricant, e.g. oil or grease, is provided, at least within the wedging gap 32. However, irrespective of the embodiment illustrated, it is understood that the starter freewheel 4 described herein can likewise be of wet-running design in order to achieve the advantages stated at the outset.

The wedging element 34 is designed as a wedging roller and has a width b in axial direction 14, 16 and an outside diameter a. The ratio of the width b to the outside diameter a of the wedging element 34 designed as a wedging roller is less than or equal to 1:2 or 1:3, preferably less than or equal to 1:4, particularly preferably less than or equal to 1:5. Thus, it is also possible to speak of a wedging element 34 in the form of a circular disk or coin.

Figure 2:
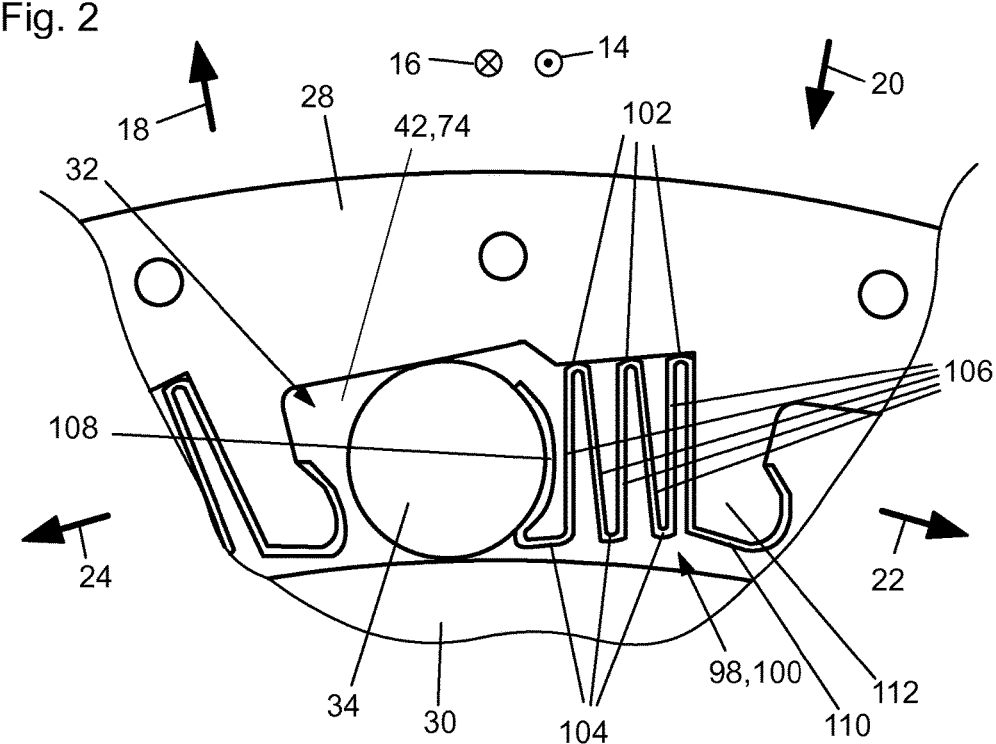
FIG. 2 shows a view along section line A-A in FIG. 1.
Figure 4:
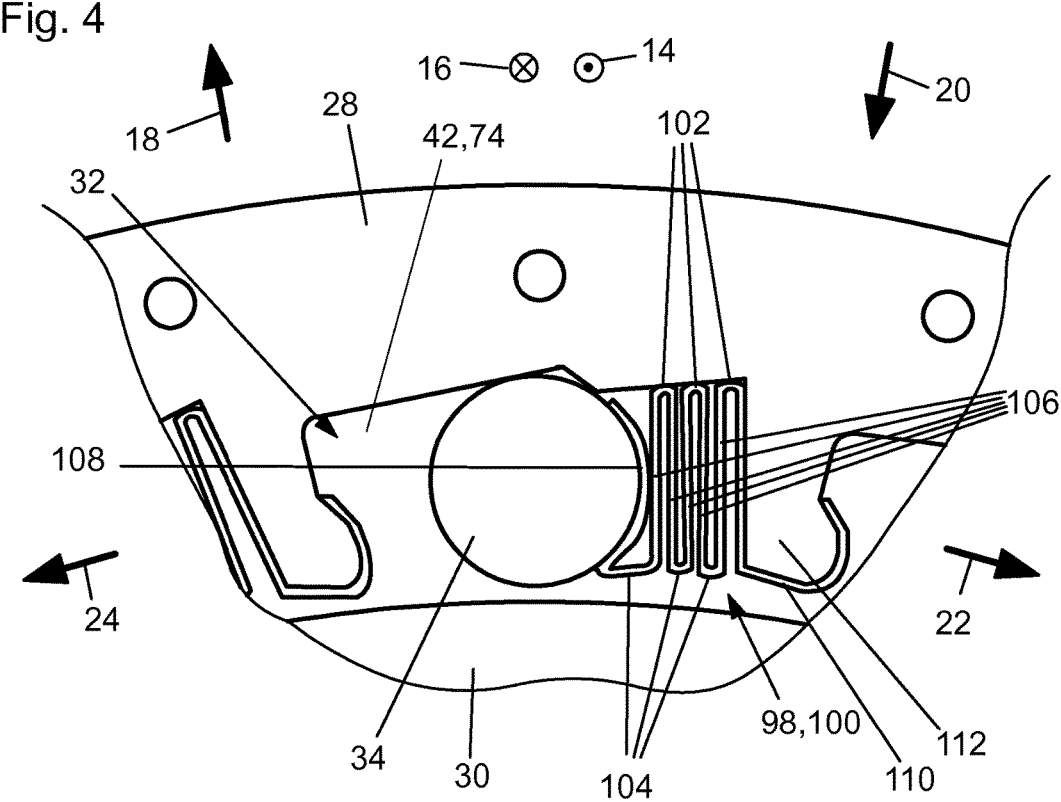
FIG. 4 shows the starter freewheel from FIG. 2 with the wedging element in the release position.

As can be seen particularly from FIG. 2, each of the wedging elements 34 is assigned a spring element 98 for preloading the wedging element 34 into a predetermined position relative to the first race 28, which is designed as an outer ring. In the present example, the spring element 98 is used to preload the wedging element 34 into the wedging position shown in FIG. 2. The wedging elements 34 can each be moved from the wedging position according to FIG. 2, in which the wedging element 34 prevents a rotation of the first race 28 relative to the second race 30 in the first circumferential direction 22, counter to the restoring force of the spring element 98 into a release position, which is shown in FIG. 4, in which the first race 28 can be rotated in the opposite, second circumferential direction 24 relative to the second race 30. Thus, in terms of its basic construction, the starter freewheel 4 described here is a "one-way clutch". In this case, the respective wedging element 34 is preloaded into the tapering wedging gap 32 in circumferential direction 24 with the aid of the spring element 98.

The spring element 98 has an elongate spring body 100. As can be seen particularly from FIG. 3, the elongate spring body 100 is designed as a sheet-metal part, in this case as an elongate sheet-metal strip. As an alternative to the sheet-metal part or sheet-metal strip, however, it is also possible to use a wire as spring body 100. In contrast to a helical spring, the spring body of which, generally a wire, is helically wound, the elongate spring body 100 of the spring element 98 extends in a radial plane defined by the radial directions 18, 20, wherein the spring body 100 has a corrugated profile in radial direction 18, 20. Here, the width direction of the sheet-metal strip used as a spring body 100 in the present embodiment corresponds substantially to the axial directions 14, 16.

Owing to its corrugated profile in radial direction 18, 20, the spring body 100 has radially outer corrugation peaks 102 and radially inner corrugation troughs 104, between which legs 106 of the elongate spring body 100 extend, preferably in a straight line. Consequently, the legs 106 are arranged substantially in alignment with one another in circumferential direction 22, 24. The radially outer corrugation peaks 102 can be supported or are supported in radially outward direction 18 on the first race 28 or the inside thereof, while the radially inner corrugation troughs 104 are preferably spaced apart in radial direction 18, 20 from the second race 30 or the outside thereof.

The spring body 100 furthermore has a supporting section 108 adjacent to the wedging element 34, on which wedging element 34 can be supported or is supported, and a fastening section 110 remote from the wedging element 34. The fastening section 110 of substantially U-shaped design is used for the latch-action fastening of the spring body 100 or of the spring element 98 on the first race 28, which has a projection 112 projecting into the wedging gap 32 in radial direction 20 for this purpose. The fastening section 110 engages with a clamping or latching action behind the projection 112, both in the circumferential directions 22, 24 and in the radial directions 18, 20, in order to bring about reliable fastening of the spring element 98 on the first race 28. As an alternative, the fastening section 110 of the spring element 98 or of the spring body 100 thereof can also be fastened with a latching action on the second race 30 or one of the two side walls 40, 42, wherein a corresponding projection 112 projecting into the wedging gap 32 could then be provided on the second race 30, the first side wall 40 or the second side wall 42.

Figure 3:
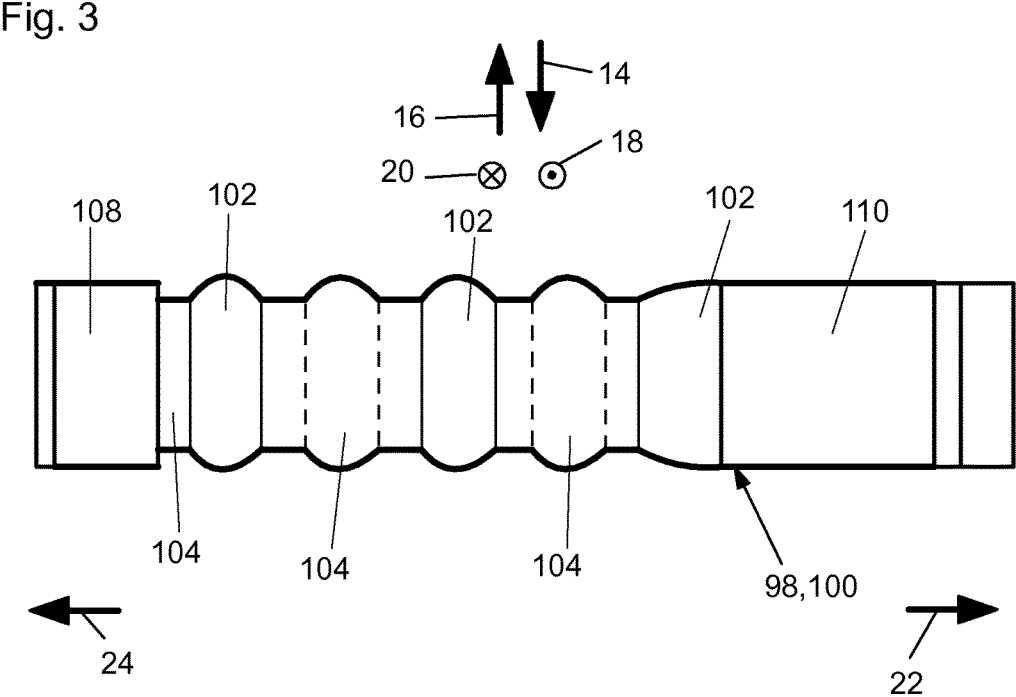
FIG. 3 shows a plan view of the spring body from FIG. 2 in isolation and on an enlarged scale.

As can be seen from FIG. 3, the spring body 100 has different widths in the axial direction 14, 16 in relation to the direction of extent thereof. Thus, in the embodiment illustrated, the corrugation peaks 102, the corrugation troughs 104, the fastening section 110 and the supporting section 108 have a greater width in the axial direction 14, 16 than the legs 106. In this way, any contact area between the spring element 98 or the spring body 100 and the side walls 40, 42 is reduced, which results or would result in reduced friction.

A second embodiment of the freewheel arrangement 2 is described below with reference to FIG. 5, said embodiment corresponding substantially to the first embodiment according to FIGS. 1 to 4, and therefore only the differences will be discussed below, identical reference signs will be used for identical or similar parts and the preceding description of FIGS. 1 to 4 otherwise applies accordingly.

Figure 5:
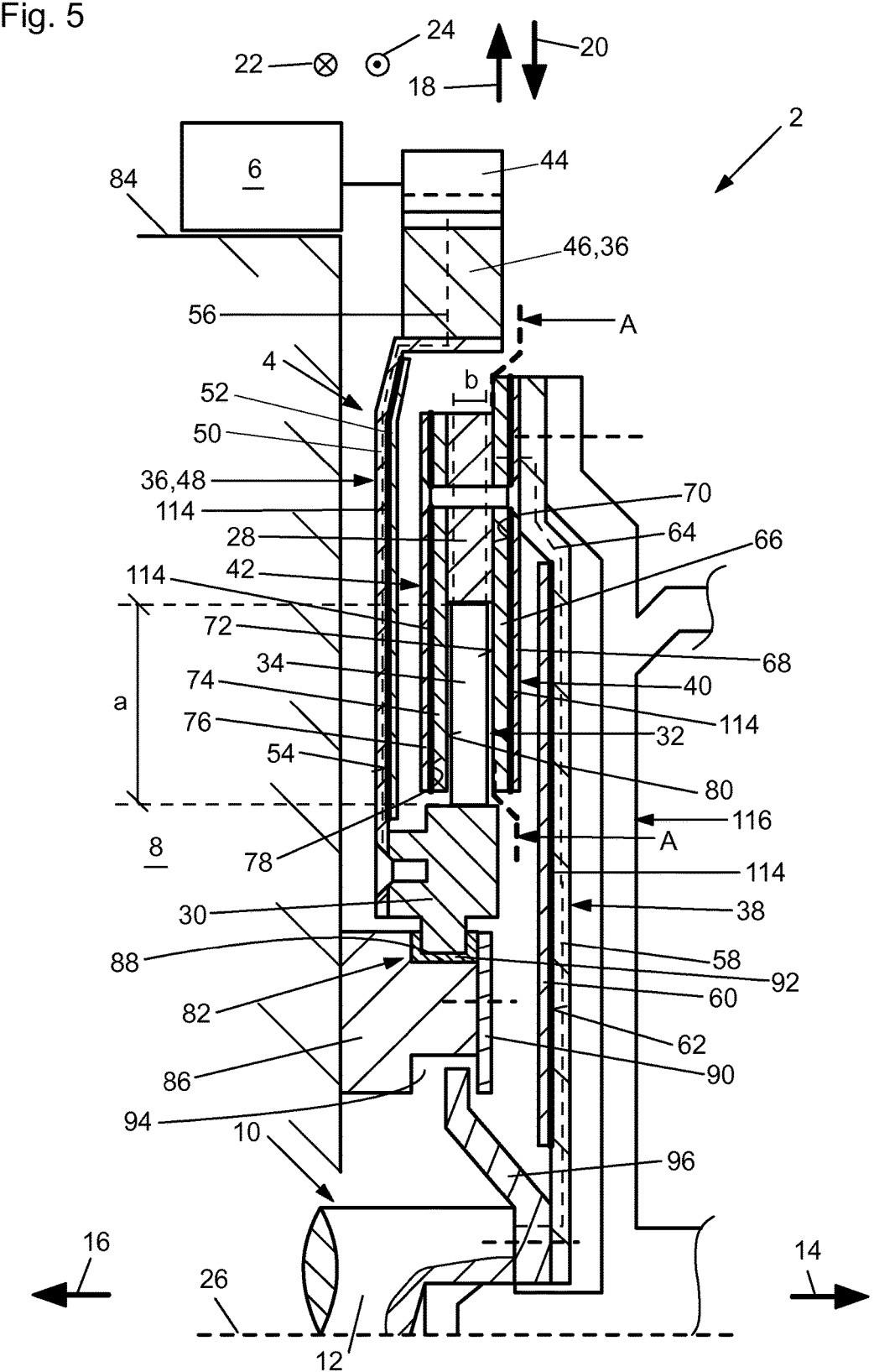
FIG. 5 shows a partial side view of a freewheel arrangement having a second embodiment of the starter freewheel according to the invention in partial section.

Whereas, in the case of the embodiment according to FIG. 1, the mutually associated sheet-metal parts 50, 52 of the starter wheel 36, the mutually associated sheet-metal parts 58, 60 of the driving wheel 38, the mutually associated sheet-metal parts 66, 68 of the first side wall 40 and the mutually associated sheet-metal parts 74, 76 of the second side wall 42 each rest on one another or are supported on one another directly or, at most, via the intermediary of an adhesive, the mutually associated sheet-metal parts in the second embodiment according to FIG. 5 rest on or are supported on one another with a damping layer 114 placed in between. In other words, the two sheet-metal parts 50, 52 of the starter wheel 36, the two sheet-metal parts 58, 60 of the driving wheel 38, the two sheet-metal parts 66, 68 of the first side wall 40 and the two sheet-metal parts 74, 76 of the second side wall 42 are connected to one another with a damping layer 114 placed in between. The damping layer 114 is softer and/or more flexible than the first sheet-metal part 50, 58, 66 and 74, respectively, on the one hand, and the second sheet-metal part 52, 60, 68 and 76, respectively, on the other hand.

In principle, the damping layer 114 could also be formed by a sheet-metal part, but it has proven advantageous if the damping layer 114 is formed from a viscoelastic and/or nonmetallic material. Moreover, the damping layer 114 is adhesively bonded to at least one of the first or second sheet-metal parts 50, 58, 66, 74; 52, 60, 68, 76, it having proven advantageous if the damping layer 114 is adhesively bonded both to the first and to the second sheet-metal part of the respective pair of sheet-metal parts. As an alternative or supplementary measure, the damping layer 114 can have been subjected to vulcanization, in which case the damping layer 114 is then vulcanized to at least one of the first and second sheet-metal parts 50, 58, 66, 74; 52, 60, 68, 76, preferably to both sheet-metal parts 50, 52; 58, 60; 66, 68; 74, 76 in order to achieve adhesion of the damping layer 114 to one or both sheet-metal parts of the respective pair of sheet-metal parts. In principle, it is furthermore also possible for the damping layer 114 to be formed as a damping layer 114 which is separate from the sheet-metal parts of the respective pair of sheet-metal parts and which is then clamped between the mutually associated sheet-metal parts 50, 52; 58, 60; 66, 68; 74, 76, which can be connected to one another nonpositively, preferably by screwing or riveting, positively or materially, preferably by welding, for example. In the case of sheet-metal parts which are adhesively bonded to one another, the damping layer 114 could be formed exclusively by the adhesive or an adhesive layer itself, but it is also advantageous if the damping layer 114 is not formed by an adhesive and is at most connected to the mutually associated sheet-metal parts 50, 52; 58, 60; 66, 68; 74, 76 by means of an adhesive or in some other way, if appropriate materially, positively and/or nonpositively.

It is furthermore common to both embodiments according to FIGS. 1 and 5 that a subsequent component 116, which is driven by means of the output side 10 of the driving unit 8 and can be formed by a clutch, a hydrodynamic converter, a flywheel or similar, for example, is in rotary driving connection with the output side 10 of the driving unit 8 by means of the driving wheel 38 designed as a flexplate in such a way that the driving wheel 38 designed as a flexplate also acts between the output side 10 and the subsequent component 116. This has the advantage that displacement of the output side 10 in the axial direction 14, 16 and/or tilting of the output side 10 relative to the axis of rotation 26 is accepted by the driving wheel 38 designed as a flexplate and is thus transmitted at most in attenuated form to the subsequent component 116.

What is claimed is:

1. A starter freewheel having a first race, a second race, a wedging gap formed between the first and second races, at least one wedging element arranged in the wedging gap, and at least one further component, which is in rotary drive connection with a corresponding one of the races, wherein the further component is formed by at least two sheet-metal parts connected to one another sandwich-fashion, wherein the two sheet-metal parts include a first sheet-metal part and a second sheet-metal part having a side face that faces the first sheet-metal part and that is supported by at least 50% of the first sheet metal part, wherein the at least one further component is a torque transmission element for transmitting a torque to and/or from the corresponding one of the races with which the component is in rotary drive connection, wherein the two sheet-metal parts are connected to one another in such a way that the torque can be transmitted via just one of the two sheet-metal parts, and the torque transmission element forms a starter wheel.

2. The starter freewheel as claimed in claim 1 wherein the two sheet-metal parts are connected to one another nonpositively, positively, or a combination of nonpositively and positively.

3. The starter freewheel as claimed in claim 1 wherein the two sheet-metal parts are connected to one another with a damping layer placed in between, wherein the damping layer is softer and/or more flexible than the two sheet-metal parts.

4. The starter freewheel as claimed in claim 3 wherein the damping layer is formed from a viscoelastic and/or nonmetallic material.

5. The starter freewheel as claimed in claim 3 wherein the damping layer is adhesively bonded to at least one of the sheet-metal parts.

6. The starter freewheel as claimed in claim 3 wherein the damping layer is vulcanized to at least one of the sheet-metal parts.

7. The starter freewheel as claimed in claim 3 wherein the damping layer is clamped between the sheet-metal parts as a damping layer separate from the sheet-metal parts.

8. A starter freewheel having a first race, a second race, a wedging gap formed between the first and second races, at least one wedging element arranged in the wedging gap, and at least one further component, which is in rotary drive connection with a corresponding one of the races, wherein the further component is formed by at least two sheet-metal parts connected to one another sandwich-fashion, wherein the at least one further component is a side wall for delimiting the wedging gap, on which the wedging element, a wedging element cage and/or a spring element for preloading the wedging element is supported, wherein the sheet-metal part adjacent to the wedging gap or at least the side of said sheet-metal part which faces the wedging gap is of a material and/or is coated so as to be more wear resistant and/or more corrosion resistant and/or less subject to friction than the sheet-metal part remote from at least a surface of the wedging gap and the side wall comprises a torque transmission element that transmits a torque to and/or from the corresponding one of the races with which the at least one further component is in rotary drive connection.

9. The starter freewheel as claimed in claim 1 further having a damping layer placed in between the two sheet-metal parts.

10. The starter freewheel as claim in claim 8 wherein the damping layer is placed between the side face and the first sheet metal part.

11. The starter freewheel as claimed in claim 7 further comprising a spring element for preloading the wedging element into a predetermined position, said spring element having an elongate spring body, which extends in a radial plane and has a corrugated profile in the radial direction and is formed by a sheet-metal part or wire.

12. The starter freewheel as claimed in claim 11 wherein the spring body has different widths in the axial direction of the starter freewheel and/or is secured on the first race, the second race and/or the side wall.

13. The starter freewheel as claimed in claim 7 wherein the wedging element comprising a wedging roller, wherein the ratio of a width (b) to an outside diameter of the wedging roller is less than or equal to 1:2.

14. The starter freewheel as claimed in claim 7 wherein the wedging element is designed as a wedging roller, wherein the ratio of a width (b) to an outside diameter of the wedging roller is less than or equal to 1:3.

15. The starter freewheel as claimed in claim 7 wherein the wedging element is designed as a wedging roller, wherein the ratio of a width (b) to an outside diameter of the wedging roller is less than or equal to 1:5.

16. The starter freewheel as claimed in claim 7 wherein the two sheet-metal parts are connected to one another nonpositively, positively, or a combination of nonpositively and positively.

17. The starter freewheel as claimed in claim 7 wherein the two sheet-metal parts are connected to one another with a damping layer placed in between, wherein the damping layer is softer and/or more flexible than the two sheet-metal parts.

18. The starter freewheel as claimed in claim 7 wherein the two sheet-metal parts include a first sheet-metal part, and a second sheet-metal part having a side face that faces the first sheet-metal part is supported by at least 50% of the first sheet metal part.

19. The starter freewheel as claimed in claim 7 wherein the side face is fully supported on the first sheet metal part.

20. The starter freewheel as claimed in claim 7 wherein the second sheet-metal part has less thickness than the first sheet-metal part.

21. The starter freewheel as claimed in claim 1 wherein the second sheet-metal part has less thickness than the first sheet-metal part.

* * * * *

UNITED STATES PATENT AND TRADEMARK OFFICE
CERTIFICATE OF CORRECTION

PATENT NO. : 9,638,269 B2  
APPLICATION NO. : 14/548418  
DATED : May 2, 2017  
INVENTOR(S) : Jochen Boelling, Dirk Achim Schmitt and Richard Baeumler Page 1 of 1

It is certified that error appears in the above-identified patent and that said Letters Patent is hereby corrected as shown below:

In the Claims

Column 16, Line 4, for claim reference number "8" should read -9-.

Column 16, Lines 7, 17, 21, 25, 29, 33, 38, 43, and 45, for claim reference number "7," each occurrence should read -8-.

Signed and Sealed this  
Twenty-seventh Day of August, 2019

Andrei Iancu  
*Director of the United States Patent and Trademark Office*